No. 781,978. Patented February 7, 1905.

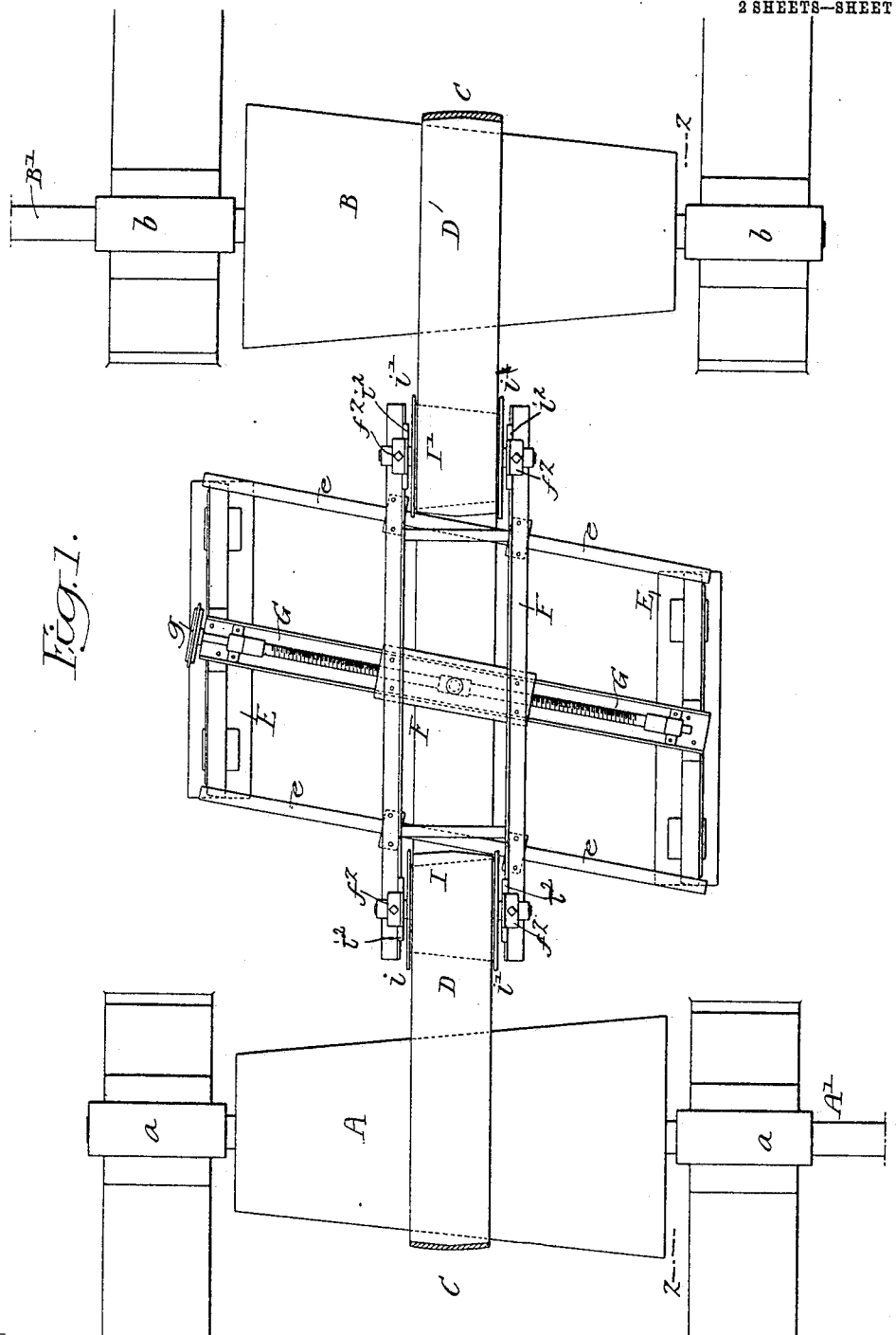

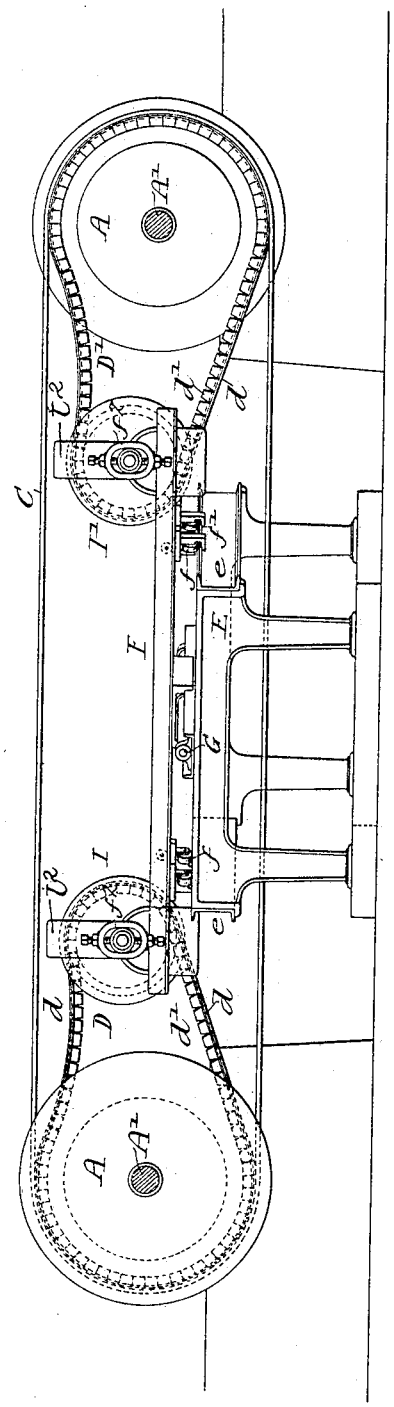

UNITED STATES PATENT OFFICE.

JOSEPH ATWOOD WHITE, OF PHILADELPHIA, PENNSYLVANIA, ASSIGNOR TO THE MOORE AND WHITE COMPANY, OF PHILADELPHIA, PENNSYLVANIA, A CORPORATION OF PENNSYLVANIA.

CONE-PULLEY SPEED-CHANGING GEAR.

SPECIFICATION forming part of Letters Patent No. 781,978, dated February 7, 1905.

Application filed March 30, 1904. Serial No. 200,821.

*To all whom it may concern:*

Be it known that I, JOSEPH ATWOOD WHITE, a citizen of the United States, residing in Philadelphia, Pennsylvania, have invented certain Improvements in Cone-Pulley Speed-Changing Gears, of which the following is a specification.

The object of my invention is to properly support the transforming-belts of a cone-pulley speed-changing gear such as illustrated and claimed in the patent granted to me on the 24th day of June, 1902, No. 703,359.

This object I attain in the following manner, reference being had to the accompanying drawings, in which—

Figure 1 is a plan view of a cone-pulley speed-changing gear, illustrating my invention. Fig. 2 is a sectional view on the line 2 2, Fig. 1.

A and B are cone-pulleys. The shaft A' of the pulley A is mounted in suitable bearings $a$, and the shaft B' of the pulley B is mounted in bearings $b$. C is the driving-belt, which passes around both pulleys. Mounted between the cone-pulley A and the driving-belt C is a transforming-belt D, and between the belt C and the pulley B is a transforming-belt D'. These two belts are identical in form. Each is made of a body $d$, to which are attached the projecting segments $d'$. Each of these sections is tapered as described in the patent alluded to above, so that the transforming-belt will conform to the surface of the pulley, while the back of the belt will conform to the driving-belt C. The transforming-belts are made larger in diameter than their cone-pulleys A and B, so that they can be adjusted to any point on the pulleys, and heretofore the loose portion of each belt was allowed to run freely without a support and was adjusted by a shifter-arm bearing directly against the edges of the belt. This construction is objectionable, especially when the mechanism is large. I overcome the objections by providing a supplementary cone-pulley for each transforming-belt, which supports the belt and through which the belt can be shifted.

In the present instance, E is a bed-plate having rails $e$, on which are mounted the wheels $f$ of the shifter-frame F. The frame has lips $f'$, which extend under the heads of the rails to prevent the frame lifting.

Mounted in bearings on the bed-plate E is a feed-screw G, having a wheel $g$, by which it is turned. This screw G meshes with a nut on the shifter-frame E, so that on turning the screw the frame F can be moved on the rails.

On the shifter-frame F are two cone-wheels I I', which act as supplemental supports for the transforming-belts. The shafts of the wheels I I' are mounted in vertically-adjustable bearings $f^2$ on the frame F, and the wheels preferably have flanges $i$ $i'$, one at each side, although the flange $i'$ at that side of the wheel of the greatest diameter may be dispensed with in some instances.

The taper of the cone-wheels I I' is the same as the taper on the pulleys A and B, and the angle of the screw G and the rails $e$ $e$ is such that the shifter-frame F can be moved along the faces of the cone-pulleys A and B without placing tension on the tranforming-belts D D' or allowing the belts to have too much slack.

When it is desired to change the speed of the driven shaft, all that is necessary is to shift the frame F by turning the screw. If the frame is shifted in one direction, the flange $i$ on one side of one of the cone-wheels will bear upon the transforming-belt, while the flange $i'$ of the other wheel will bear upon its transforming-belt, and the lateral thrust upon the belt will cause it to shift on its cone-pulley, either increasing or diminishing the speed of the driven shaft, according to the direction of movement of the shifting frame.

I find that the flange $i'$ of the cone-pulleys need not be used in all cases, as the taper of the cone is sufficient to keep the belt from moving laterally without the use of a flange; but I prefer to provide the small end of the conical pulley with the flange $i$, as it keeps the transforming-belt in proper alinement and acts to shift the belt when the shifter-frame F is moved.

On each bearing is a guard-plate $i^2$, extending beyond the flanges $i$ $i$ of the cone-wheels I I' to prevent the transforming-belt crawling on top of the flanges if by accident they should become slack. The guard-plates may be used in place of the flanges when plain pulleys are used.

It will be seen by the above description that I provide suitable supports for the loose end of each transforming-belt and that through these supports the belts are shifted so as to change the speed of the driven shaft. Furthermore, by this construction I can keep the transforming-belts under control and do not have to use a shifter to contact with the driving-belt C.

The speed-change gear shown in the drawings is intended for heavy work and is mounted on the floor or other suitable support; but it will be understood that the mechanism may be mounted on the ceiling or on the wall without departing from my invention.

I claim as my invention—

1. The combination in a speed-change gear, of a cone-pulley, a driving-belt, a transforming-belt mounted between the cone-pulley and the driving-belt, and a supplemental support for the slack end of the transforming-belt to keep it out of contact with the driving-belt, substantially as described.

2. The combination of a cone-pulley, a driving-belt, a transforming-belt mounted between the cone-pulley and the driving-belt and larger than the cone-pulley, with a cone-wheel forming a supplemental support for the slack end of the transforming-belt, substantially as described.

3. The combination of a cone-pulley, a driving-belt, a transforming-belt mounted between the driving-belt and the cone-pulley, a cone-wheel having a flange at the side of the least diameter and acting as a supplemental support for the transforming-belt, substantially as described.

4. The combination of a cone-pulley, a driving-belt, a supplemental belt mounted between the driving-belt and the cone-pulley, a cone-wheel acting as a supplemental support for the transforming-belt, said wheel having a flange at each side, substantially as described.

5. The combination of a driving and a driven cone-pulley, a driving-belt passing around both pulleys, a transforming-belt for each cone-pulley and mounted between the pulley and the driving-belt, said transforming-belts being larger than their pulleys, a shifter-frame, cone-wheels mounted on said frame and acting as supplemental supports for the transforming-belts, substantially as described.

6. The combination of a driving and a driven shaft, a cone-pulley on each shaft, a driving-belt passing around both cone-pulleys, a transforming-belt for each pulley, said belts being mounted between the pulley and the driving-belt and being tapered in cross-section so as to conform to the face of the pulley, the bearing-face and the driving-belt, a shifting frame and two conical wheels mounted on said frame and acting as supplemental supports for the transforming-belts, said wheels having flanges, substantially as described.

7. The combination of a driving and a driven shaft, a cone-pulley on each shaft, a driving-belt passing around both pulleys, transforming-belts mounted between each pulley and the driving-belt, each transforming-belt being larger than the cone-pulley, conical wheels acting as supplemental supports for the transforming-belts, a shifter-frame, diagonal rails for the shifter-frame, and a diagonally-arranged screw engaging the frame, substantially as described.

In testimony whereof I have signed my name to this specification in the presence of two subscribing witnesses.

JOSEPH ATWOOD WHITE.

Witnesses:
  WILL. A. BARR,
  JOS. H. KLEIN.